(12) United States Patent
Fletcher et al.

(10) Patent No.: US 6,678,536 B2
(45) Date of Patent: Jan. 13, 2004

(54) WIRELESS MICROPHONE

(76) Inventors: Mark Wendell Fletcher, P. O. Box 195, Bragg Creek, Alberta (CA), T0L 0K0; Jonathan Airey, 5008 43rd Street SW, Calgary, Alberta (CA), T3E 3R3

( * ) Notice: Subject to any disclaimer, the term of this patent is extended or adjusted under 35 U.S.C. 154(b) by 227 days.

(21) Appl. No.: 09/731,202

(22) Filed: Dec. 7, 2000

(65) Prior Publication Data

US 2002/0072398 A1 Jun. 13, 2002

(51) Int. Cl.[7] .................................................. H04M 1/00
(52) U.S. Cl. ........................ 455/569.1; 455/569.2; 455/90.3; 455/575.9
(58) Field of Search ........................... 455/569, 90, 60, 455/425, 550, 345, 575, 573; 359/143, 152, 153, 154, 109, 113; 381/26, 28, 91, 92, 111, 122, 375, 376

(56) References Cited

U.S. PATENT DOCUMENTS

| | | | |
|---|---|---|---|
| 4,543,665 A | 9/1985 | Sotelo | ........................ 455/606 |
| 5,636,264 A * | 6/1997 | Sulavuori et al. | ........... 359/113 |
| 5,642,402 A | 6/1997 | Vilmi | ........................... 379/58 |
| 5,749,057 A | 5/1998 | Takagi | ....................... 455/569 |
| 5,802,167 A | 9/1998 | Hong | ......................... 379/388 |
| 5,991,646 A | 11/1999 | Frank | ......................... 455/569 |
| 6,169,807 B1 * | 1/2001 | Sansur | ........................ 381/57 |
| 6,421,426 B1 * | 7/2002 | Lucey | ......................... 455/575 |
| 6,434,363 B2 * | 8/2002 | Rinne et al. | .................. 455/66 |
| 6,452,402 B1 * | 9/2002 | Kerai | ......................... 324/538 |

OTHER PUBLICATIONS

SGS–Thomson Microelectronics ETC5064/64–X Serial interface CODEC/Filter with receive power amplifier (pp. 1–18, Nov. 1994).*

* cited by examiner

*Primary Examiner*—Nguyen T. Vo
*Assistant Examiner*—Sonny Trinh
(74) *Attorney, Agent, or Firm*—I. Zborovsky

(57) ABSTRACT

A wireless microphone has a base unit connectable to a transmitting/receiving unit adapted to at least transmit signals to another party, a head unit spaced from the base unit and receiving signals from a user, a unit for transmitting signals between the head unit and the base unit with infrared radiation.

5 Claims, 4 Drawing Sheets

WIRELESS MICROPHONE

BACKGROUND OF THE INVENTION

The present invention relates generally to wireless microphones.

Wireless microphones can be used for example in vehicles in association with cellular phones, in portable video cameras, computers, and other multi-media devices, as well as other two-way communication devices such as aircraft headsets. When installing for example a hands-free cellular telephone in an automobile, the microphone placement is critical. It has been found that the best position for clarity of broadcast is close to the user's mouth, for example using a headset or alternatively, mounting the microphone on the lapel of the user or on the steering wheel of the vehicle. However, installation of a wired microphone to these areas requires the removal and reinstallation of much automotive trim., or wiring is intrusive to the driver's environment. Also, in conventional microphones which make use of RF technology, security and radio interference can be an issue. Some devices of this type are disclosed in U.S. Pat. Nos. 4,543,665; 5,966,643; 5,642,402; 5,749,057; 5,802,167; 5,991,646. It is therefore believed to be advisable to develop a new wireless microphone which avoids the disadvantages of the prior arts.

SUMMARY OF THE INVENTION

Accordingly, it is an object of the present invention to provide a wireless microphone, which avoids the disadvantages of the prior art.

In keeping with these objects and with others which will become apparent hereinafter, one feature of the present invention resides, briefly stated, in a wireless microphone which has a base unit connectable to a transmitting/receiving unit and provided with an infrared receiver, and a head unit having a microphone and provided with an infrared transmitter which transmits an infrared signal to the infrared receiver of the base unit so as to be further transmitted to the transmitting/receiving unit.

When the microphone is designed in accordance with the present invention, the signals introduced by a user of the microphone are transmitted with the use of the infrared technology, which avoids the disadvantages of the prior art.

In accordance with another feature of present invention, the base unit and the head unit are each provided with infrared transceivers, and the head unit is provided also with a speaker, so that when a user uses the microphone the signal is transmitted from the head unit to the base unit and at the same time the base unit can receive signals and transmit back to the head unit and then through the speaker to a user.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
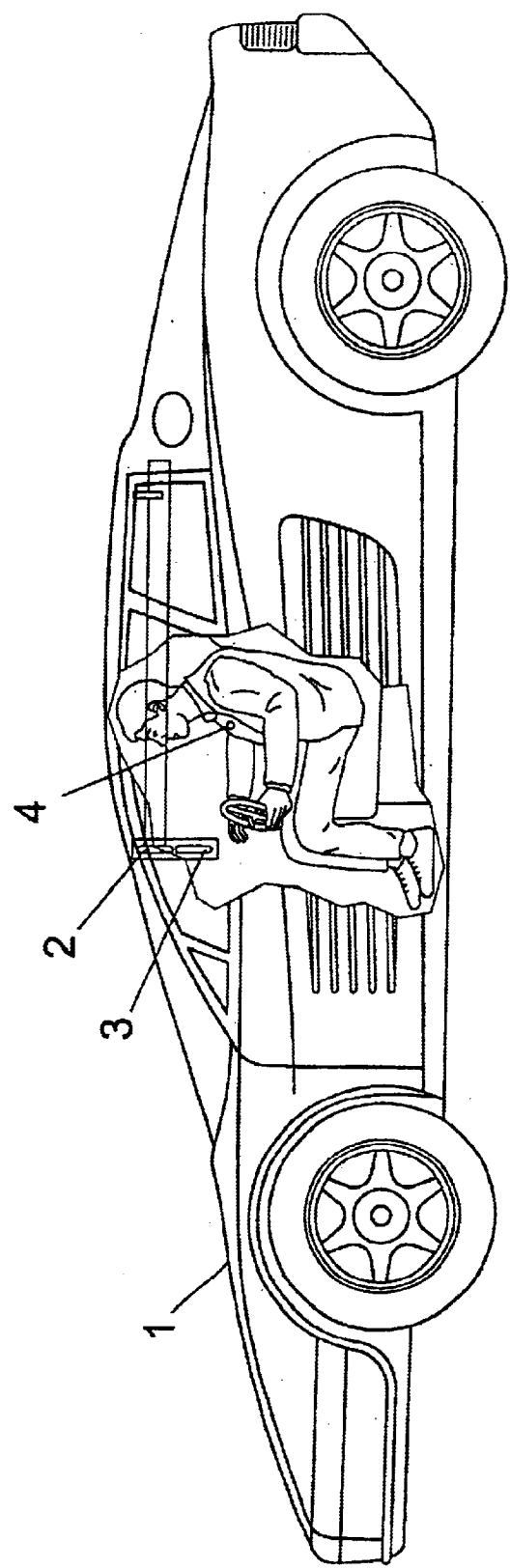
FIG. 1 is a view showing a vehicle provided with a wireless microphone in accordance with the present invention.

A wireless microphone in accordance with the present invention is shown in FIG. 1 as associated with a vehicle which is identified as a whole with reference numeral 1. The microphone has a base unit identified with reference numeral 2 and connected with a transmitting/receiving unit formed for example as a cellular phone 3. The microphone also has a head unit identified with reference numeral 4.

Figure 2A:
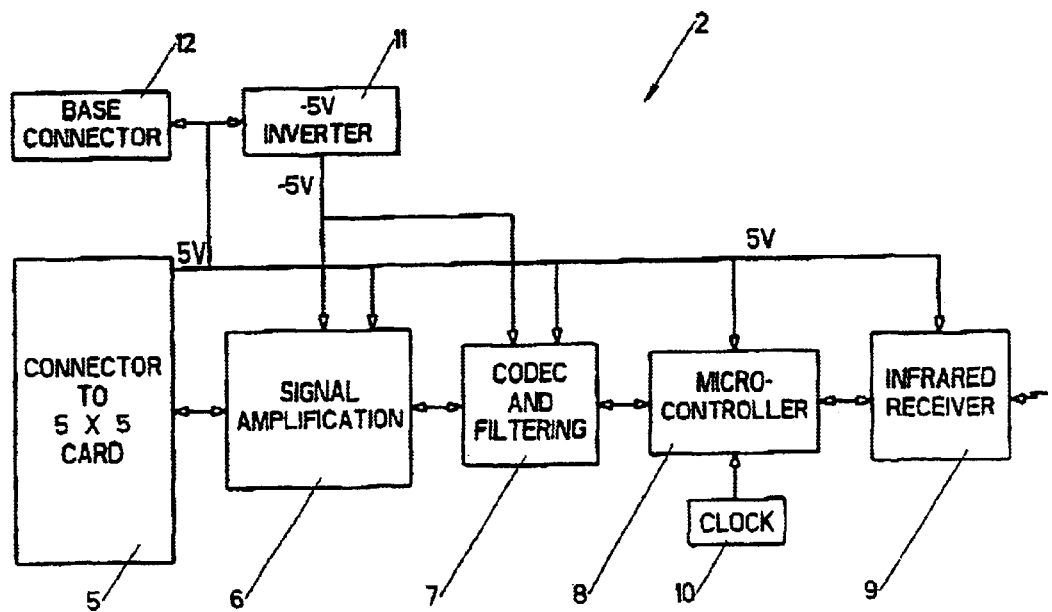
FIGS. 2a and 2b are views showing a wireless microphone with a base unit and a head unit in accordance with one embodiment of the present invention.
Figure 2B:
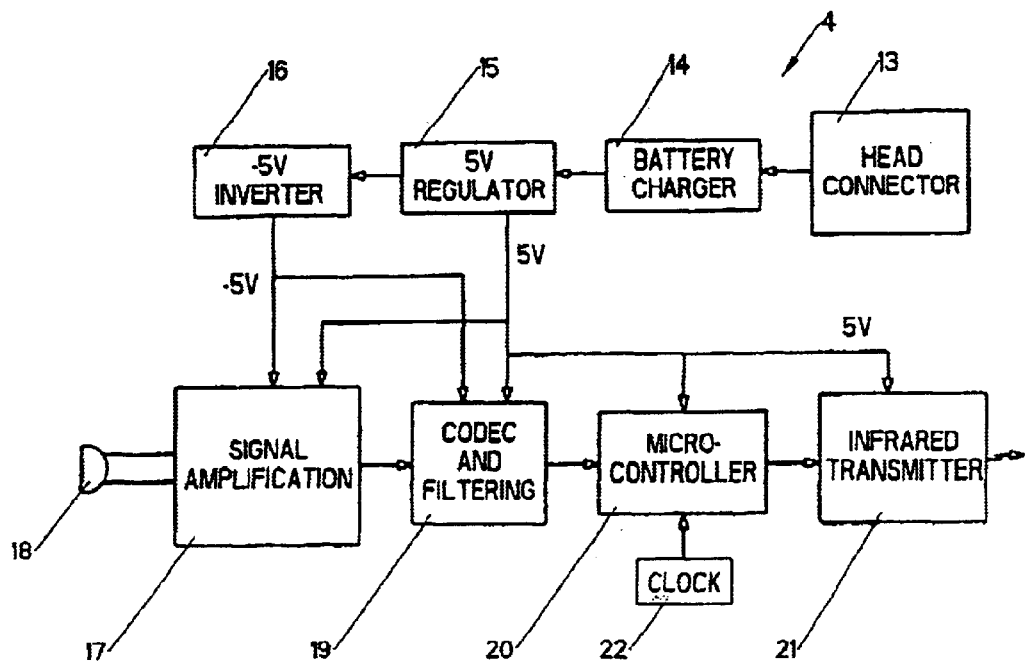

FIGS. 2a and 2b show a first embodiment of the inventive wireless microphone. The base unit 2 includes two connectors. One of them is shown as item 5 and is connected to 5×5 card which receives and transmits analog voice signal from/to a cell phone. The head unit is usually operated by an on-board battery. When the battery is low, the head unit is connected to one of the connectors identified as 12, on the base unit. In this case, the head unit will operate on the 5V power supply from the base unit and charge the battery on the head unit at the same time.

The base unit further has a signal amplification block 6 which amplifies the voice signal from codec. The codec and filtering block is identified with reference numeral 7. It converts the digital voice data from the head unit 4 to the analog signal and then sends it to the 5×5 card after the amplification block 6. A microcontroller block 8 receives the digital data from an infrared receiver 9 and then sends the data to the codec block 7. It generates the 8 Khz clock for the codec block 7 and the microcontroller block series peripheral interface port (SPI) that works at slave mode. The microcontroller block 8 also provides the whole base unit with power-down mode management. A clock 10 provides 2.048 Mhz clock for the codec block 7 and the microcontroller block 8. The infrared receiver block 9 receives wirelessly data from the head unit 4, as will be explained herein below. The base unit 2 further has -5V invertor block 11. It inverts the 5V power supply from 5×5 card to -5V, which is required by the signal amplification block 6 and the codec block 7. Finally, the base unit 2 has a connector 12 to the head unit 4. When it connects the base unit 2 to the head unit 4, it provides a power supply for the head unit operation and battery charger.

The head unit 4 has a connector 13 to the base unit 2. It connects the head unit 4 to the base unit 2. The head unit 4 further has a battery charger block 14 which is designed to charge two-cell lithium-ion battery to 8.2V. A 5V regulator block 15 regulates the battery voltage to 5V required by the head unit. A -5V inverter block 16 inverts the 5V from 5V regulator 15 to -5V, which is required by signal amplification and codec blocks specified herein below. The signal amplification block is identified with reference numeral 17. It amplifies the voice signal from a microphone input member 18. A codec and filtering block 19 filters and digitizes the voice analog signal from the microphone input member 18 and sends voice data to the microcontroller block 20. The microcontroller block 20 transmits the data from the codec block 19 to an infrared transmitter 21. It generates the 8 Khz clock for the codec block 19 and the microprocessor series peripheral interface port (SPI) that works at slave mode. It also provides the whole head unit with power-down mode management. A clock 22 provides 2.048 Mhz clock for the codec block 19 and the microcontroller block 20. The infrared transmitter block 21 transmits wirelessly to the base unit 2. The transmitting distance can be more than 1 m.

It is believed that the operation of the device shown in FIGS. 2a and 2b is clear. When a person uses the microphone member 18, the speech signal is processed in the head unit 4 and transmitted from its infrared transmitter 21 to the infrared receiver 9 of the base unit 2 which after processing is transmitted to the not-shown transmitting/receiving element connected to the 5×5 card.

Figure 3A:
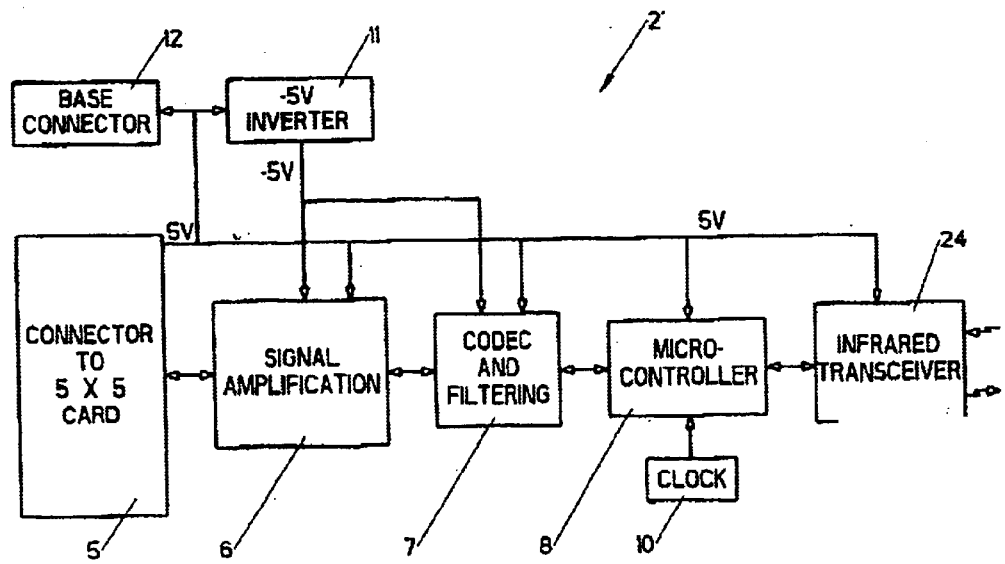
FIGS. 3a and 3b are views showing a base unit and a head unit of the wireless microphone in accordance with another embodiment of the present invention.
Figure 3B:
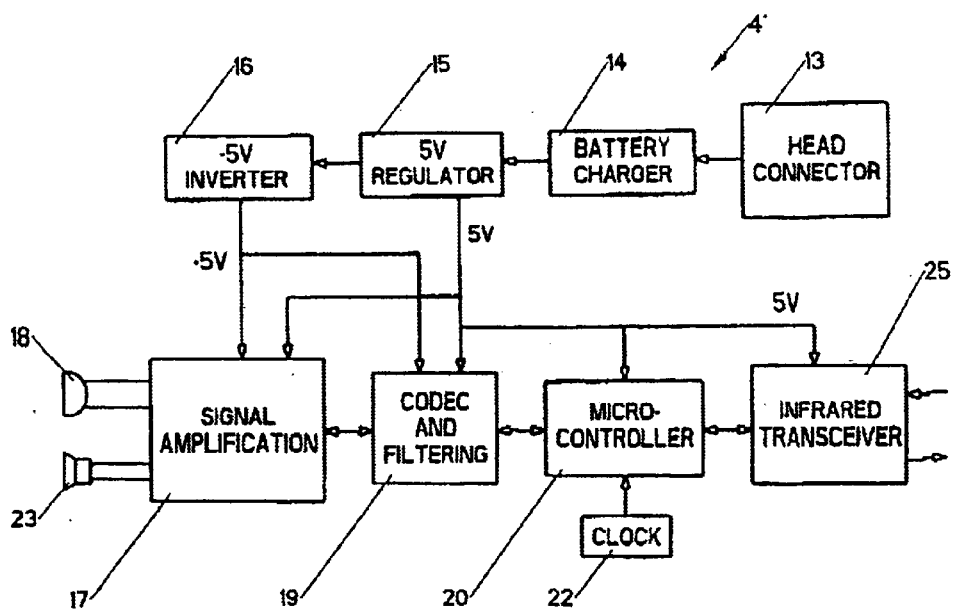
Figure 4:
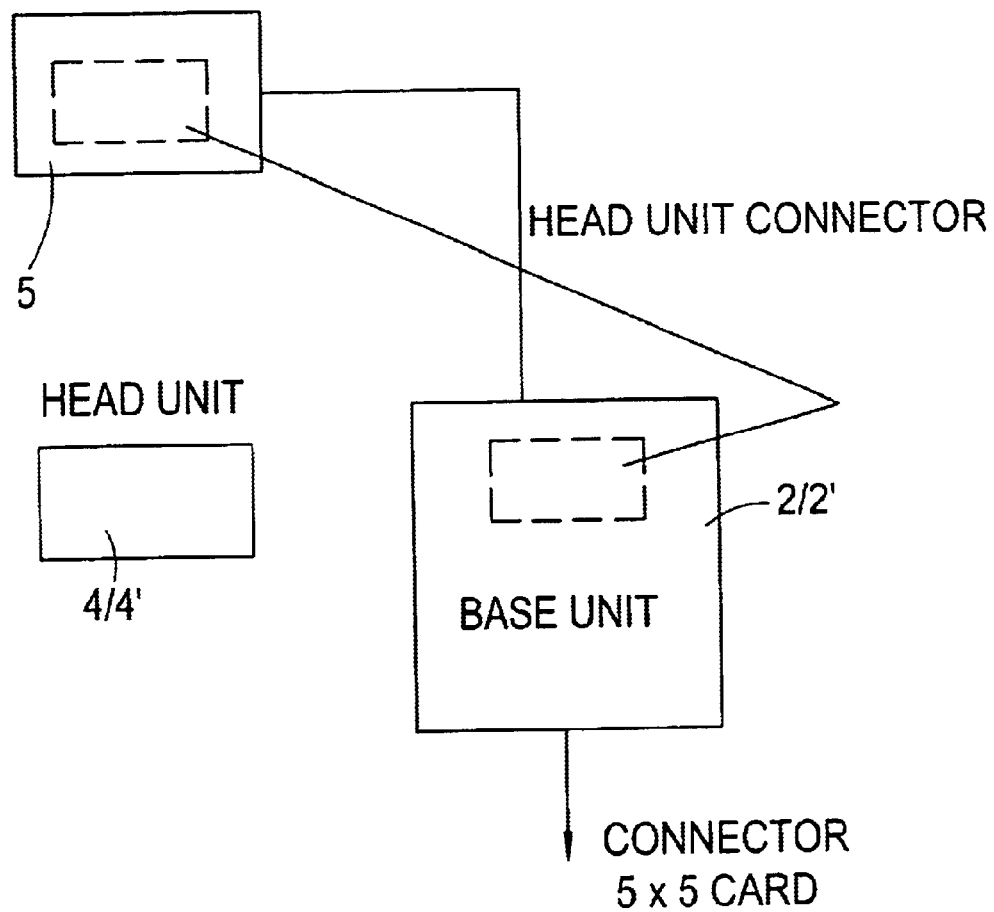
FIG. 4 shows another embodiment of the present invention.

The embodiment as shown in FIGS. 3a, 3b includes some blocks which are similar to the blocks of the embodiments of FIGS. 2a, 2b and therefore they are identified with the same reference numerals. In this embodiment the head unit 4' is provided additionally with a speaker which is identified with reference numeral 23. The base unit 2', instead of the infrared receiver is provided with an infrared transceiver 24, it transmits and receives data wirelessly to/from the head unit 4'. The transmitting distance can be more than 1 m. The head unit 4' in this embodiment, instead of the infrared transmitter, has an infrared transceiver 25. It transmits and receives data wirelessly to/from the base unit 2'. The transmitting distance can be also more than 1 m. While in the embodiment of FIGS. 2a, 2b a signal produced by a user and introduced into the microphone input member 18 is transmitted from the head unit 4 to the base unit 2 through the infrared transmitter 21/infrared receiver 9 and then to the transmitting/receiving unit connected to the 5×5 card, the head unit in accordance with the embodiments shown in FIGS. 3a, 3b operates both in the transmitting mode and in the receiving mode. The transmitting mode is the same as in the embodiment of FIGS. 2a, 2b. A signal introduced by a user into the microphone input member 18 is transmitted from the head unit 4' to the base unit 2' through the infrared transceivers 25/24. In addition, the signals introduced from the transmitting/receiving unit via the 5×5 card are transmitted from the base unit 2' to the head unit 4' through the infrared transceivers 24/25, and then transmitted to the speaker 23 and received by a user from the speaker.

The base unit 2, 2' and head unit 4, 4' can be arranged at any location of the corresponding equipment which allow transmission of the infrared radiation transmission.

In accordance with a further feature of the present invention, the wireless microphone can be provided with an auxiliary head unit identified with reference numeral 5. The auxiliary head unit 5 can be connected, for example permanently through the connector to the base unit 2. The auxiliary unit 5 provides a recharging foot print. When the head unit 4 is connected to the auxiliary unit 5, the head unit 5 will be charged through the auxiliary unit 5 from the base unit 2, also the auxiliary head unit 5 can be wire-connected with the base unit 2, and therefore this will optimize a signal input during the recharging cycle of the head unit 4.

The device in accordance with the present invention is not limited to the head unit receiving only voice or data by sound. The head unit equipped with an IR transceiver, is able to receive data via an IR signal from an electronic device, such as a PDA, computer, etc. The head unit that receives this signal will then transmit the data to the base unit for processing. An example as to how this may be used is a user writes an E-mail message on his PDA, which is transmitted to the head unit which transmits to the base unit for broadcast through traditional means. Alternatively the electronic device may communicate via the IR signal directly with the base unit, if the electronic device were equipped with a standard IR transmitter/transceiver. If the electronic device were not so equipped the head unit may be attached to the electronic device using the appropriate input/output connectors and the signal would then be transmitted from the device, through the head unit and subsequently to the base unit.

In accordance with the present invention, the head unit can contain a power source such as a battery or fuel cell and can have no power management-functions, simply an "on/off" switch. Alternatively, the head unit can be designed so that "powers down" when not in use and is "woken" by a wireless signal from the base unit. The IR transceiver in this case would carry two signals, one for data and one for power management function. The power management will control the power drain of the head unit, dependent on such parameters as distance from the base unit, or IR signal strength between the base and head unit.

It will be understood that each of the elements described above, or two or more together, may also find a useful application in other types of constructions differing from the types described above.

While the invention has been illustrated and described as embodied in wireless microphone, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wireless microphone, comprising a base unit connectable to a transmitting/receiving unit adapted to at least transmit signals to another party; a head unit receiving signals from a user; and means for transmitting signals from said head unit to base unit with infrared radiation, said transmitting means include an infrared transmitter provided in said head unit and transmitting signals received from the user, and an infrared receiver provided in said base unit and receiving the signals transmitted from said head unit, said base unit has an input microphone member through which signals from the user are introduced into said base unit, each of said units including a signal amplification block, a codec and filtering block connected with said signal amplification block, and a microcontroller block connected with said codec and filtering block, each of said blocks includes an infrared element selected from the group consisting of an infrared transmitter and an infrared receiver, said infrared element being connected with said microcontroller.

2. A wireless microphone as defined in claim 1, wherein each of said blocks includes an inverter block which inverts 5V power supply to −5V to be supplied to said signal amplification block and to said codec block.

3. A wireless microphone as defined in claim 1; and further comprising means for connecting said units with one another and including a first connector provided in said base unit and second connector provided in said head unit and connectable with and disconnectable from one another.

4. A wireless microphone, comprising a base unit connectable to a transmitting/receiving unit adapted to at least transmit signals to another party; a head unit receiving signals from a user; and means for transmitting signals from said head unit to base unit with infrared radiation, said transmitting means include a first infrared transceiver provided in said head unit and a second infrared transceiver provided in said base unit, so that signals can be transmitted from said base unit to said head unit and from said head unit to said base unit through said infrared transceivers with infrared radiation, said head unit has an input microphone member through which signals from the user are introduced into said head unit and transmitted to said base unit through said infrared transceivers, and also a speaker which receives signals transmitted from said base unit to said head unit through said infrared transceivers to be received by the user, each of said units including a signal amplification block, a codec and filtering block connected with said signal amplification block, and a microcontroller block connected with said codec and filtering block, each of said blocks includes I an infrared transceiver, said infrared transceiver being connected with said microcontroller.

5. A wireless microphone, comprising a base unit connectable to a transmitting/receiving unit adapted to at least transmit signals to another party; a head unit receiving signals from a user; and means for transmitting signals from said head unit to base unit with infrared radiation, and an auxiliary head unit connected with said base unit, said first mentioned head unit being connectable to said auxiliary head unit for recharging and wired communication between said head unit and said base unit.

* * * * *